United States Patent
Kennedy et al.

(10) Patent No.: US 7,422,371 B2
(45) Date of Patent: Sep. 9, 2008

(54) ACTIVE HYBRID FDB MOTOR

(75) Inventors: Michael D. Kennedy, Boulder Creek, CA (US); Alan L. Grantz, Aptos, CA (US); Anthony J. Aiello, Santa Cruz, CA (US); Paco Flores, Felton, CA (US); Klaus D. Kloeppel, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 409 days.

(21) Appl. No.: 11/054,928

(22) Filed: Feb. 9, 2005

(65) Prior Publication Data

US 2006/0177165 A1 Aug. 10, 2006

(51) Int. Cl.
*F16C 32/06* (2006.01)
(52) U.S. Cl. .......................... 384/107; 384/110; 384/112
(58) Field of Classification Search ................. 384/100, 384/107, 110, 112, 114, 121
See application file for complete search history.

(56) References Cited

U.S. PATENT DOCUMENTS

| | | | |
|---|---|---|---|
| 5,013,947 A | 5/1991 | Ide | |
| 5,089,732 A | 2/1992 | Konno et al. | |
| 5,142,173 A | 8/1992 | Konno et al. | |
| 5,283,491 A | 2/1994 | Jabbar et al. | |
| 5,358,339 A * | 10/1994 | Konno et al. | 384/107 |
| 5,423,612 A | 6/1995 | Zang et al. | |
| 5,969,448 A | 10/1999 | Liu et al. | |
| 5,980,113 A | 11/1999 | Grantz | |
| 6,019,516 A | 2/2000 | Leuthold et al. | |
| 6,071,014 A * | 6/2000 | Lee et al. | 384/107 |
| 6,149,161 A | 11/2000 | Grantz et al. | |
| 6,154,339 A | 11/2000 | Grantz et al. | |
| 6,196,722 B1 * | 3/2001 | Asada et al. | 384/107 |
| 6,483,215 B1 * | 11/2002 | Bodmer et al. | 310/90 |
| 6,674,201 B2 * | 1/2004 | Liu et al. | 310/91 |
| 6,799,892 B2 | 10/2004 | Leuthold et al. | |
| 6,817,767 B2 | 11/2004 | Kennedy et al. | |
| 6,900,567 B2 | 5/2005 | Aiello et al. | |
| 7,239,477 B2 * | 7/2007 | Aiello et al. | 360/99.08 |

* cited by examiner

*Primary Examiner*—Thomas R Hannon
(74) *Attorney, Agent, or Firm*—Novak Druce + Quigg LLP

(57) ABSTRACT

An active fluid bearing system is provided. In one example, the active fluid bearing system includes an interface region formed between an outer surface of an inner member and an opposing inner surface of an outer member. The inner and outer members are disposed for relative rotation of the inner and outer members, and thereby form an interface region having a hydrodynamic bearing region and an active bearing region. A liquid is disposed in the interface region at the hydrodynamic bearing region, and is further disposed in the active bearing region if the inner and outer members are not relatively rotating. The bearing system is operable for evacuating at least a portion of the liquid from the active bearing region during relative rotation of the inner and outer members. The active bearing region may be a journal bearing or a thrust bearing.

24 Claims, 6 Drawing Sheets

ACTIVE HYBRID FDB MOTOR

BACKGROUND

1. Field

The present invention relates generally to fluid dynamic bearings (FDB), and more particularly to FDB's as used in motors for disc drive storage systems.

2. Related Art

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has led to greater precision and lower tolerance in the manufacturing and operating of magnetic storage discs. For example, to achieve increased storage densities the transducer head is placed increasingly close to the surface of the storage disc to track increasingly densely positioned data tracks. As the density of the data tracks increases it is generally desired that the disc rotate substantially in a single plane with reduced run-out. A slight wobble or non-repeatable run-out in disc rotation can limit track spacing to account for misreads by the transducer head, thereby lowering track density. Accordingly, it is desired to reduce and minimize non-repeatable run-out in the system.

From the foregoing discussion, it can be seen that the stability of the bearing assembly supporting the storage disc is of importance. One typical bearing assembly comprises ball bearings supported between a pair of races, which allow a hub of a storage disc to rotate relative to a fixed member.

An alternative bearing design is a fluid dynamic bearing. A fluid dynamic bearing provides a lubricating fluid such as gas or a liquid in a bearing gap between a fixed member and a rotating member.

Gas dynamic bearings have been recognized as being suitable for lower power applications because the viscosity of gas is lower than conventional lubricating liquids, such as oil. Gas dynamic bearings typically have less damping than a fluid bearing and tend to provide wear properties inferior to liquid bearings at low rotational speeds, such as those during spin-up of discs in a drive. Liquid dynamic bearings generally have better damping characteristics and tend to provide relatively high lubricity during spin-up.

SUMMARY

According to one aspect, an active hybrid fluid dynamic bearing is provided. In one example, an active fluid dynamic bearing system comprises an interface region (i.e., a gap) disposed between at least an outer surface of an inner member and an opposing inner surface of an outer member. The inner and outer members are disposed for rotation of the inner and outer members relative to each other. A hydrodynamic bearing region and an active bearing region are disposed in the interface region. A liquid is disposed in the interface region at the hydrodynamic bearing region and the active bearing region, wherein the inner and outer members are operable for evacuating at least a portion of the liquid from the active bearing region during relative rotation of the inner and outer members.

In one example, the inner and outer members are operable for evacuating substantially all of the liquid from the active bearing during relative rotation such that the active bearing functions transiently as a liquid bearing during spin-up and a gas bearing during steady-state operation. The active bearing may be a thrust bearing or journal bearing (including, for example, a cylindrical, conical, or spherical bearing). Further, the exemplary active fluid dynamic bearing may be included in a spindle motor of a disc drive or the like.

According to another aspect, a method for forming an active hybrid dynamic bearing is provided.

BRIEF DESCRIPTION OF THE DRAWINGS

For a fuller understanding of examples used herein, reference is made to the accompanying drawings in the following detailed description.

FIG. 4 illustrates an expanded cross section view of a portion of FIG. 2a;

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

In one aspect and one example described herein, an exemplary active hybrid fluid dynamic bearing system is provided. The fluid dynamic bearing system includes a liquid-lubricated hydrodynamic bearing and an active bearing, wherein the active bearing starts and stops (e.g., at relatively low rotational speeds) in a liquid-lubricated hydrodynamic condition, but evacuates at least a portion (and in some examples all) of the liquid to become a gas bearing during steady-state rotating conditions of the bearing system. The active bearing may evacuate the liquid through groove pumping action during relative rotation of the bearing members. The exemplary active fluid dynamic bearing may provide for a highly efficient, low-wear, long-life gas-liquid hybrid bearing system by actively balancing a relatively large, low-power gas bearing against a relatively small, high-damping liquid bearing.

It should be noted that the term "journal bearing" as used herein includes bearings having a radial stiffness component in the system such as cylindrical bearing, conical bearings, spherical bearings, and the like. Further, "pumping," "pumping action," and similar descriptions do not necessarily imply the actual movement or flow of liquid in the system and may refer merely to the relative pressure of the liquid in the system.

Figure 1:
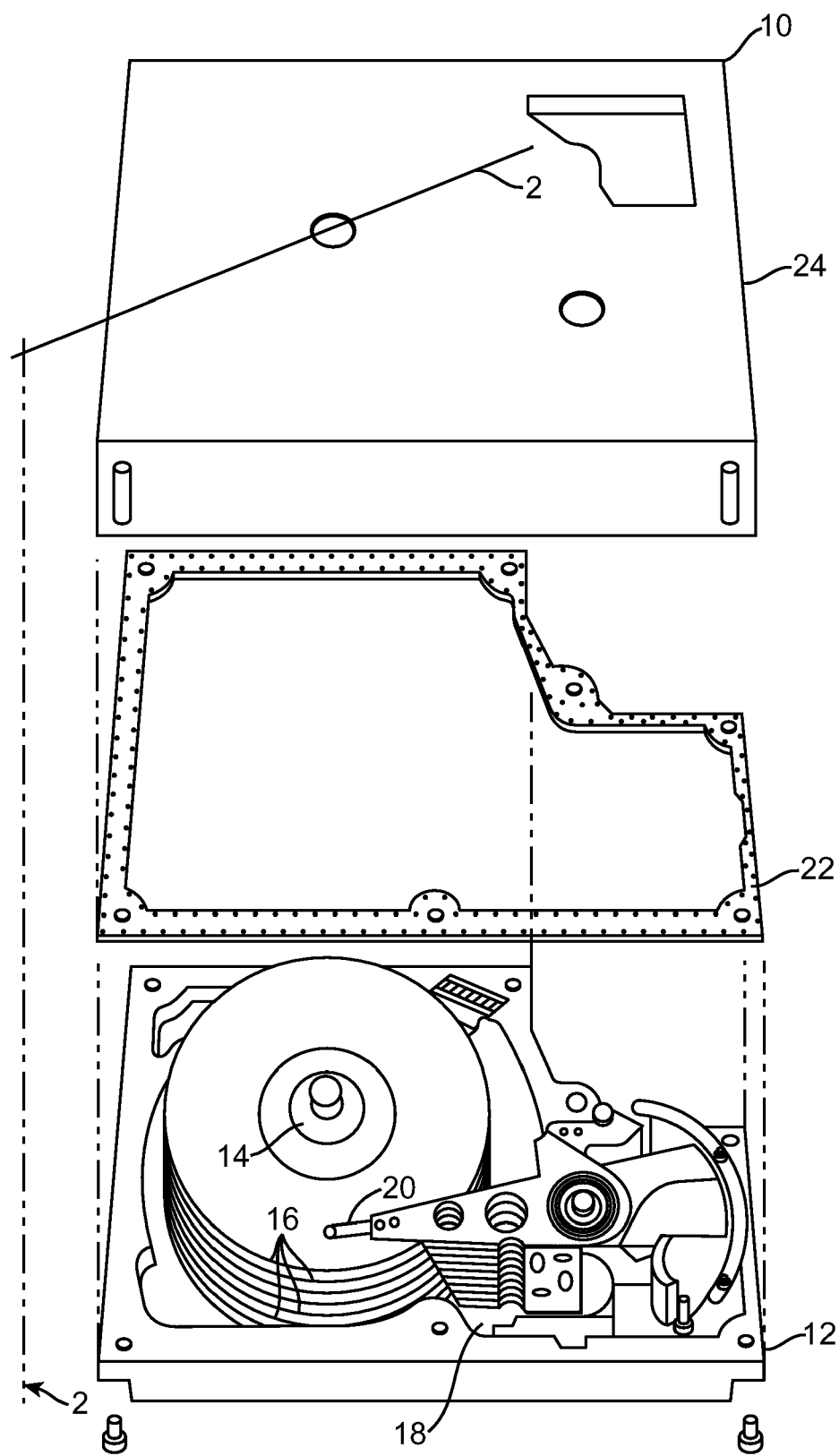
FIG. 1 illustrates an exploded perspective view of a magnetic disc drive storage system.

FIG. 1 is an exploded perspective view of a magnetic disc drive storage system in which an exemplary active dynamic bearing system may be used. In this particular example, the storage system 10 includes a housing base 12 having spindle motor 14 which rotatably carries storage discs 16. An armature assembly 18 moves transducers 20 across the surfaces of discs 16. The environment of discs 16 is sealed by seal 22 and cover 24. In operation, discs 16 rotate at high speed while transducers 20 are positioned at any one of many radially differentiated tracks on the surface of the discs 16. This allows the transducers 20 to read and write magnetically encoded information on the surfaces of discs 16 at selected locations as the discs rotate beneath the transducers 20. Because spindle motor 14 rotatably supports discs 16, spindle motor 14 includes at least one low friction rotatable portion that is supported by one or more bearing surfaces.

Figure 2A:
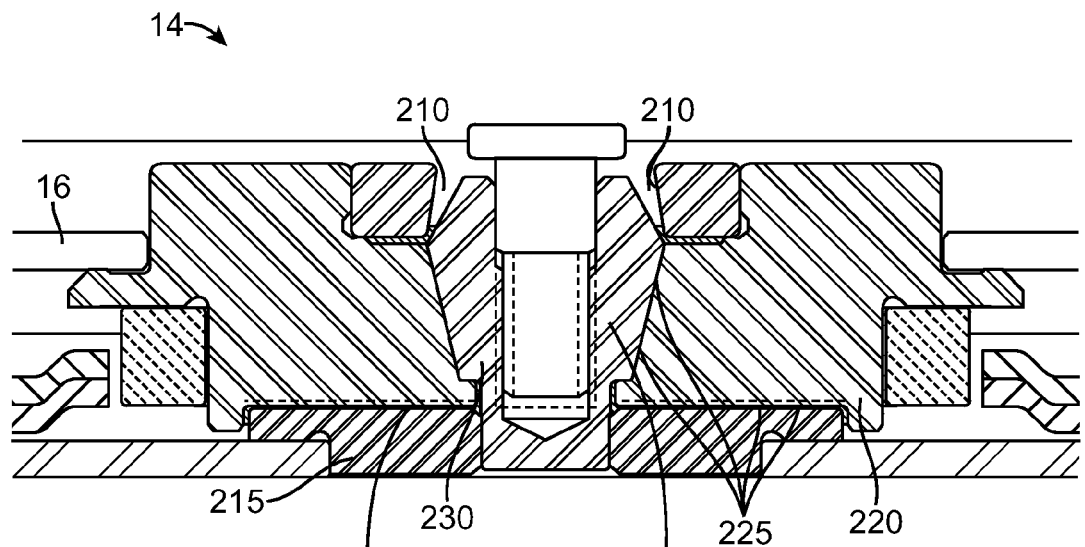
FIG. 2a illustrates a cross section of a spindle motor wherein examples of the active bearing system may be used.
Figure 3:
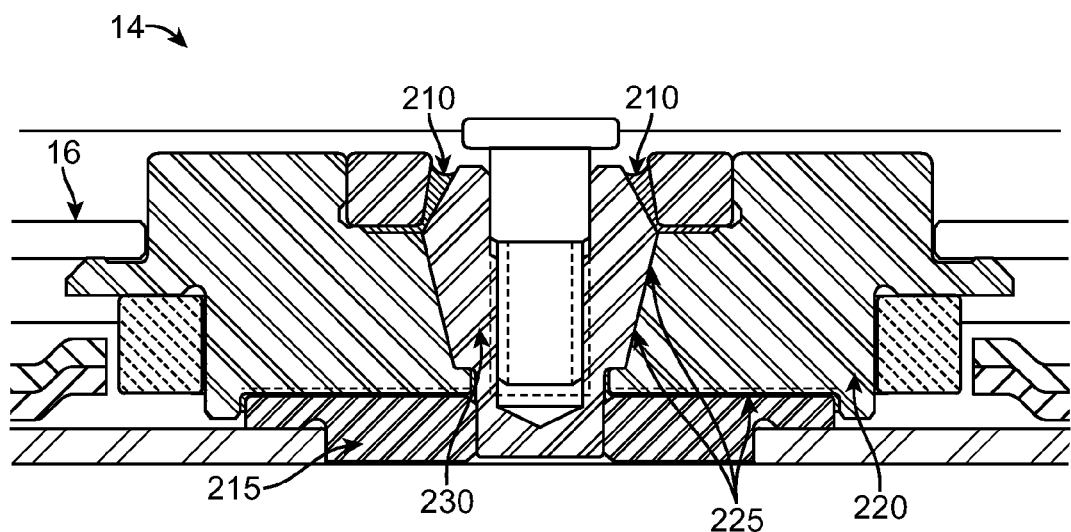
FIG. 3 illustrates a cross section of the spindle motor of FIG. 2a, wherein the spindle motor is in an operating condition.
Figure 4:
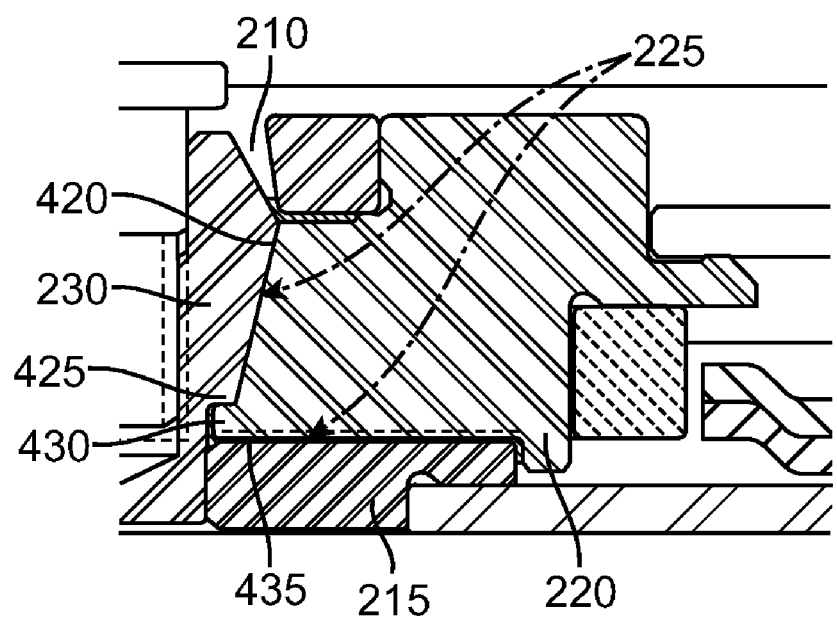
Figure 5:
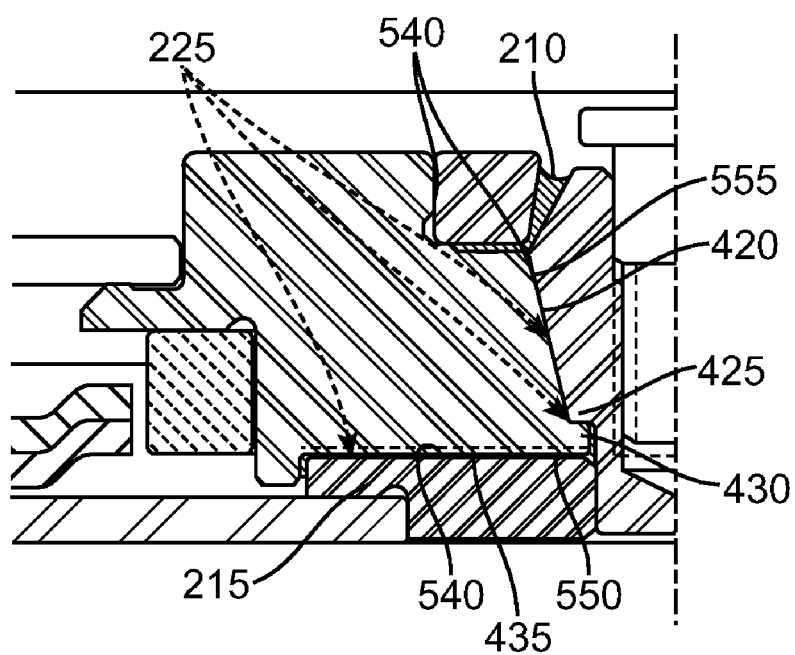
FIG. 5 illustrates an expanded cross section of a portion of FIG. 3.

Turning now to FIGS. 2a and 3, a cross-section of spindle motor 14 is illustrated in a non-rotating and rotating state, respectively. Further, FIGS. 4 and 5 illustrate more detailed views of FIGS. 2a and 3 and may be referenced in conjunction with FIGS. 2a and 3. In this example, a bearing gap is defined in part by an outer surface of an inner member including shaft 230 and thrust plate 215 and an inner surface of an outer member including hub 220 disposed in facing radial opposition to the inner member. The bearing gap between the inner and outer members is referred to herein generally as the interface region 225. Hub 220 and the inner member are disposed for relative rotation, such that in the present example, hub 220 may rotate with respect to shaft 230 and thrust plate 215.

As illustrated in FIG. 4, interface region 225 includes a hydrodynamic journal bearing region 420 and an active thrust bearing region 435. In the present example, the hydrodynamic journal bearing region 420 is formed by the facing radial opposition of the outer surface of shaft 230 and the inner surface of a portion of hub 220. The active thrust bearing region 435 is formed by the facing radial opposition of the upper surface of thrust plate 215 and the lower surface of another portion of hub 220. Between the hydrodynamic journal bearing region 420 and the active thrust bearing region 435, the lower surface of the hub 220 includes a crown 425 (for accommodating misalignment between shaft 230 and thrust plate 215, for example).

Figure 2B:
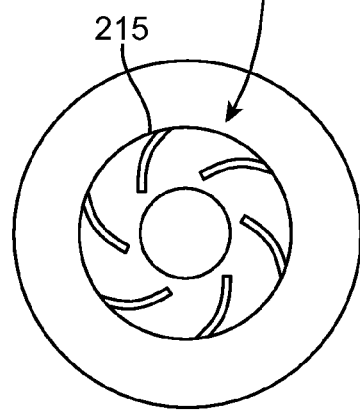
FIGS. 2b and 2c illustrate exemplary groove patterns.
Figure 2C:
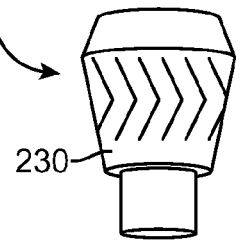

The hydrodynamic journal bearing region 420 includes pumping grooves disposed proximate capillary seal 210 region on at least one of the two surfaces that define the hydrodynamic journal bearing region 420 of the interface region 225 (in this example, the inner surface of hub 220 and the outer surface of shaft 230). For example, FIG. 2c illustrates an exemplary groove region formed on the outer surface of shaft 230.

The hydrodynamic journal bearing region 420 may also include other pumping grooves disposed more distal the capillary seal 210 region and separated from the grooves proximate the capillary seal by a portion without grooves. As is known in the art, the pumping action of these grooves pressurizes the liquid and produces radial stiffness between the inner and outer members.

The active thrust bearing region 435 also contains pumping grooves disposed on at least one of the surfaces defining the interface region 225 at the active thrust bearing region 435 (in this example, a portion of the lower surface of hub 220 and the upper surface of thrust plate 215). For example, FIG. 2b illustrates an exemplary groove region formed on the upper surface of thrust plate 215. These pumping grooves pressurize and pump the fluid in the active thrust bearing region 435. As is illustrated in FIG. 2a, the active thrust bearing region 435 contains liquid during non-operation of the spindle motor 14 (i.e., when there is no rotation between the surfaces defining the bearing regions).

When the motor begins to spin (commonly referred to as "spin-up" or "startup"), the grooves in active thrust bearing region 435 pressurize liquid in active thrust bearing region 435 and hydrodynamic journal bearing region 420 (as illustrated in FIG. 4) and drive liquid into capillary seal region 210. To effect this result in one example, the pumping action on startup of the grooves in active thrust bearing region 435 is stronger than the pumping action of grooves opposing the pumping direction of the active thrust bearing region (such grooves may include the grooves in hydrodynamic journal bearing region 420). In this example, the relatively stronger pumping action may be achieved by an active thrust bearing region 435 having a larger working surface area than the hydrodynamic journal bearing region 420 working surface area. In other examples, however, the relative pumping action may be achieved by a variety of bearing factors including length, gap, groove depth, and the like as will be recognized by those of ordinary skill in the art.

Instead of or in conjunction with the pumping grooves in active thrust bearing region 435, in other examples, hydrodynamic bearing region 420 may contain grooves that pump liquid from the active thrust bearing region 435 (i.e., a pulling rather than pushing pumping action).

As the liquid is being evacuated from the active thrust bearing region 435, the active thrust bearing region 435 transitions from functioning as a hydrodynamic bearing to a gas bearing (as illustrated in FIGS. 2a and 3). As more liquid is evacuated, and active thrust bearing region 435 increasingly functions as a gas bearing, the pumping action of the active thrust bearing region 435 decreases in strength until the pumping actions of the active thrust bearing region 435 and the hydrodynamic journal bearing region 420 reach an equilibrium.

In one example, the bearing system (including active thrust bearing region 435 and hydrodynamic bearing region 420) may be designed such that equilibrium is reached after active thrust bearing region 435 is functioning entirely as a gas bearing. In another example, equilibrium may be reached after partial evacuation of the liquid from active thrust bearing region 435. Because active thrust bearing region 435 functions at least partially as a gas thrust bearing during full speed rotation of the relatively rotating members (i.e., during full speed operation of the spindle motor 14), the power consumption of the spindle motor 14 should be less than a comparable spindle motor 14 employing a hydrodynamic thrust bearing in conjunction with a hydrodynamic journal bearing.

FIG. 5 illustrates a vertical cross-section of spindle motor 14 operating with active thrust bearing 435 as a gas bearing. The liquid level in capillary seal 210 is illustrated as being higher than in FIG. 4, as expected. Inner surface of bearing sleeve 555 and upper surface of thrust plate 550 are specifically identified in this figure, but appear also as surfaces not explicitly identified in prior illustrations.

As can be seen by contrasting FIG. 2a from FIGS. 3 and 5, upon evacuation from the active thrust bearing region 435, the liquid is pumped into the capillary seal 210 area, thereby causing the level of liquid in the capillary seal 210 area to rise. The spindle motor 14 continues operating with the active thrust bearing region 435 and the hydrodynamic journal bearing region 420 in a dynamic equilibrium while the spindle motor 14 continues operating.

As the spindle motor 14 begins to spin-down (decreasing in RPM), the pumping action of the active thrust bearing region 435 is no longer sufficient to prevent the liquid from returning to the active thrust bearing region 435, and the liquid begins to return, thereby displacing the gas in active thrust bearing region 435. As liquid returns, the relatively rotating inner and outer members of the bearing complete rotation (i.e., the rotating members stop) with the inner and outer opposing surfaces substantially lubricated with liquid. In contrast to the exemplary active thrust bearing 435 of spindle motor 14, a conventional gas thrust bearing starts and stops without liquid lubrication at its gas thrust bearing surfaces, and may consequently wear more quickly than the present example.

After spindle motor 14 ceases to rotate, capillary forces may continue to cause return of liquid into the active thrust bearing region 435 (depending on the amount of liquid that returned during spin down). Thus, the level of liquid in the capillary seal 210 will be higher during operation of the motor than during non-operation. Since during operation of the motor the level of liquid is higher in the capillary seal 210, the rate of evaporation of the liquid during operation is expected to be higher than during non-operation. However, for applications where the motor is expected to start and stop frequently (intermittent operation), the present active bearing system is expected to result in lower evaporation of liquid by virtue of a lower level of liquid in the capillary seal 210 area during non-operation, and in a longer lived motor due to reduced friction during starting and stopping of the spindle motor 14.

The examples of FIGS. 2a-6 illustrate a spindle motor 14 having a conical crowned type shaft. Examples may also be employed in spindle motors having straight shafts. In a straight shaft example, it would be desirable to include an axial displacement limiting element to prevent shaft 230 from axially moving with respect to hub 220. A magnetic bias may also be used to preload a thrust bearing, such as active thrust bearing region 435, in such an example (i.e., axially offsetting the magnet versus the stator).

Other designs are known for pumping liquid in a spindle motor 14. Such designs may also be employed in other examples of the invention. For example, an alternative approach to the examples of FIGS. 2a-5 can employ asymmetric chevron-style thrust grooves to pump liquid through a port in fluidic communication with a reservoir portion (such as capillary seal 210). In such examples, a gas port may also be provided to the bearing region from which liquid is being pumped to provide a means for balancing pressures in the system.

Although the previously illustrated example was directed to an active thrust bearing, it is to be recognized that examples may comprise active journal bearings as well (i.e., a journal bearing region from which liquid is at least partially evacuated upon relative rotation of members defining the journal bearing region). An exemplary portion of a spindle motor 14 having an active journal bearing region 610 formed between two relatively rotatable members is illustrated in FIGS. 6a and 6b.

In the present illustration, a shaft having an inverted conical portion 605 and a cylindrical portion 607 is one of the relatively rotatable members and a hub 635 is the other. As illustrated, hub 635 includes a conical cavity portion having an inner face disposed in radial opposition to an outer face of the inverted conical portion 605. In the exemplary bearing system, the inner face of the hub 635 includes a spiral groove pattern 615 (of course, various groove patterns may be used in place of or in addition to a spiral groove pattern). In other examples, the outer face of the inverted conical section may have a groove pattern as shown in FIG. 6c. The disposition of the outer face of the inverted conical section and the inner face of the hub 635 form an active journal bearing region 610 in the interface region 225.

This example also includes a radial shoulder 650 extending from the cylindrical portion under a portion of the hub 635, thereby providing a hydrodynamic thrust bearing region 630 in the interface region 225. The radial shoulder 650 is separately formed and attached to the cylindrical portion, or the shoulder 650 is placed in proximity to the cylindrical member without attachment to the cylindrical member.

Figure 6A:
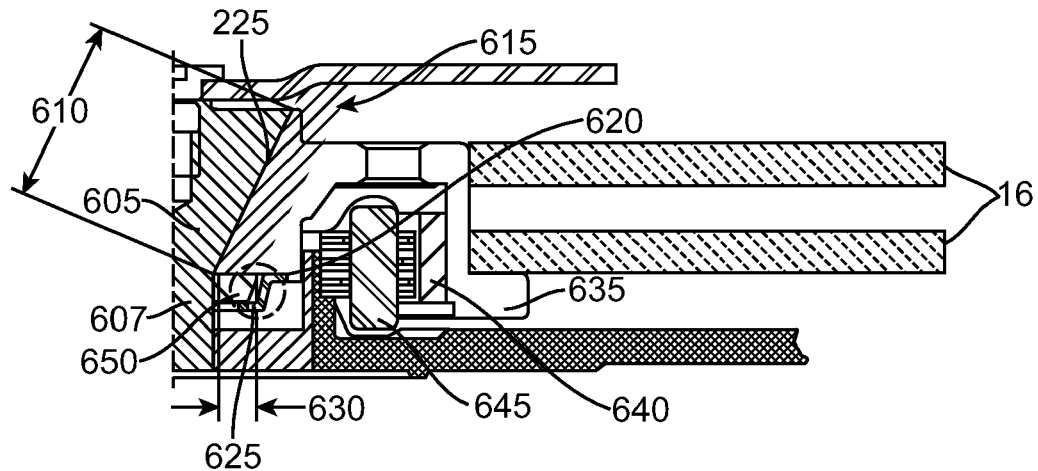
FIGS. 6a and 6b illustrate a spindle motor having a bearing system with an active journal bearing and a hydrodynamic thrust bearing.
Figure 6B:
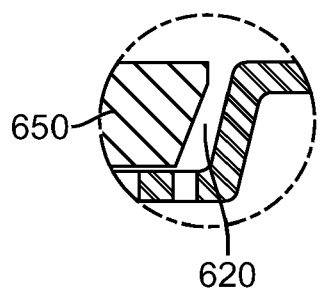
Figure 6C:
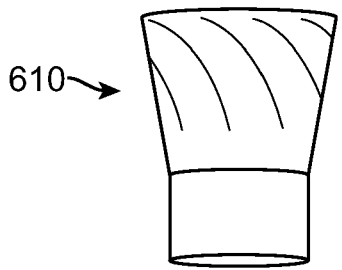
FIGS. 6c and 6d illustrate exemplary groove patterns.
Figure 6D:
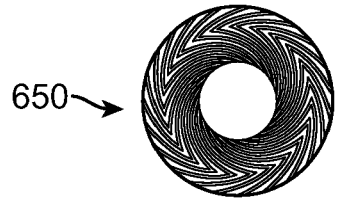

FIGS. 6a and 6d illustrates that chevron pumping grooves are formed on a surface of the radial shoulder 650 opposed to a surface of the hub 635 in this example. Pumping grooves may also be disposed on an inner surface of hub 635 opposed to the surface of the radial shoulder 650. Other pumping groove patterns suitable for a thrust bearing may be used in addition to or in place of chevron patterned grooves.

On starting of the spindle motor, the pumping grooves 615 on the inner surface of the hub 635 (opposed to an outer surface of the inverted conical portion 605) begin to pump liquid disposed within the interface region 225 at the active journal bearing region 610 towards the hydrodynamic thrust bearing region 630. The pumped liquid is stored in a reservoir area 620, which is in fluidic communication with the interface region 225.

The pumping action of active journal bearing region 610 reaches a dynamic equilibrium with the pumping action of hydrodynamic thrust bearing region 630. The dynamic equilibrium may provide that a portion of active journal bearing region 610 continues to have liquid and thereby function substantially as a hydrodynamic bearing while another portion of the active journal bearing region 610 may be substantially free of liquid and thus function as a gas bearing. During relative rotation of the inner and outer members, the pumping action of active journal bearing region 610 opposes the pumping action of hydrodynamic thrust bearing region 630 to establish a dynamic equilibrium that substantially maintains a desired amount of liquid in the active journal bearing region 610. FIG. 6b illustrates a larger view of the reservoir area 620 in communication with interface region 635.

Those of ordinary skill in the art will recognize that spindle motors having exemplary bearing systems may be constructed with regard to both spin-up of the spindle motor (i.e., spin-up of the relatively rotatable members) during which liquid is pumped from the active bearing region, and also to the active balancing of the gas bearing and the hydrodynamic thrust bearing when equilibrium is achieved. With respect to this balancing, grooving in each of the bearings may be adjusted to achieve a desired effect, including having the active bearing become entirely a gas bearing after reaching equilibrium or only partially a gas bearing and partially hydrodynamic at equilibrium. Of course, spindle motors may include more than one active bearing system, or more than one active bearing but only one hydrodynamic bearing, or more than one hydrodynamic bearing but only one active bearing, as desired.

Additionally, spindle motor designs are known in the art that circulate liquid through one or more interface regions by virtue of channels, holes, grooves, or other structural elements appropriately disposed. Other examples may comprise such spindle motors, so long as the circulating liquid generally does not circulate through an active bearing region (whether an active journal bearing region 610 or active thrust bearing region 235).

This description is exemplary and it will be apparent to those of ordinary skill in the art that numerous modifications and variations are possible. For example, various exemplary methods and systems described herein may be used alone or in combination with various FDB systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. An active fluid dynamic bearing system, comprising:
   an interface region formed between an outer surface of an inner member and an opposing inner surface of an outer member, the inner and outer members disposed for rotation of the inner and outer members relative to each other, and the interface region including a hydrodynamic bearing region and an active bearing region; and
   a liquid disposed in the interface region at the hydrodynamic bearing region and at the active bearing region,
   wherein the inner and outer members are operable for evacuating at least a portion of the liquid from the active bearing region during relative rotation of the inner and outer members,
   wherein the active bearing region functions as a gas bearing after evacuation of the liquid.

2. The bearing system of claim 1, wherein the active bearing region is a journal bearing having a cylindrical, conical, or spherical shape.

3. The bearing system of claim 1, wherein the inner member includes a thrust plate and a shaft.

4. The bearing system of claim 1, wherein the hydrodynamic bearing region includes a groove pattern on at least one of the outer surface of the inner member and the inner surface of the outer member, and the active bearing region includes a groove pattern formed on at least one of the outer surface of the inner member and the inner surface of the outer member.

5. The bearing system of claim 4, wherein the groove pattern of the hydrodynamic bearing region is a spiral groove pattern or a chevron groove pattern.

6. The bearing system of claim 1, wherein the liquid returns to the active bearing region upon spin-down of the relative rotating inner and outer members.

7. The bearing system of claim 1, further comprising a magnet disposed to preload the active bearing region for spin-up of the inner and outer members, and wherein the inner member is a straight shaft.

8. The bearing system of claim 1, wherein the active bearing region pumps the liquid through the hydrodynamic bearing region into a reservoir.

9. The bearing system of claim 8, wherein the reservoir includes a capillary seal.

10. The bearing system of claim 8, wherein the reservoir includes a high-volume low-pressure seal.

11. An active fluid dynamic bearing system, comprising:
    an interface region formed between an outer surface of an inner member and an opposing inner surface of an outer member, the inner and outer members disposed for rotation of the inner and outer members relative to each other, and the interface region including a hydrodynamic bearing region and an active bearing region; and
    a liquid disposed in the interface region at the hydrodynamic bearing region and at the active bearing region,
    wherein the inner and outer members are operable for evacuating at least a portion of the liquid from the active bearing region during relative rotation of the inner and outer members, and
    wherein the inner member includes a shoulder portion facing a first surface of the outer member and forming a gap therebetween and a second portion facing a second surface of the outer member forming a portion of the active bearing region such that at least some of the portion of the liquid evacuated from the active bearing region flows into the gap.

12. The bearing system of claim 11, wherein the second portion includes a crowned portion.

13. The bearing system of claim 11, wherein the active bearing region includes a journal bearing.

14. The bearing system of claim 11, wherein the shoulder portion and the first surface of the outer member form part of a thrust bearing.

15. The bearing system of claim 11 wherein the first and second surfaces of the outer member are part of the same surface.

16. An active fluid dynamic bearing system, comprising:
    an interface region formed between an outer surface of an inner member and an opposing inner surface of an outer member, the inner and outer members disposed for rotation of the inner and outer members relative to each other, and the interface region including a hydrodynamic bearing region and an active bearing region; and
    a liquid disposed in the interface region at the hydrodynamic bearing region and at the active bearing region,
    wherein the inner and outer members are operable for evacuating at least a portion of the liquid from the active bearing region during relative rotation of the inner and outer members,
    wherein the active bearing region is a thrust bearing.

17. An active fluid dynamic bearing system, comprising:
    an interface region formed between an outer surface of an inner member and an opposing inner surface of an outer member, the inner and outer members disposed for rotation of the inner and outer members relative to each other, and the interface region including a hydrodynamic bearing region and an active bearing region; and
    a liquid disposed in the interface region at the hydrodynamic bearing region and at the active bearing region,
    wherein the inner and outer members are operable for evacuating at least a portion of the liquid from the active bearing region during relative rotation of the inner and outer members,
    wherein the hydrodynamic bearing region includes a groove pattern on at least one of the outer surface of the inner member and the inner surface of the outer member, and the active bearing region includes a groove pattern formed on at least one of the outer surface of the inner member and the inner surface of the outer member, and
    wherein the groove pattern of the active bearing region pumps the liquid more strongly than the groove pattern of the hydrodynamic bearing region during spin-up of the inner and outer members.

18. An active fluid dynamic bearing system, comprising:
    an interface region formed between an outer surface of an inner member and an opposing inner surface of an outer member, the inner and outer members disposed for rotation of the inner and outer members relative to each other, and the interface region including a hydrodynamic bearing region and an active bearing region; and
    a liquid disposed in the interface region at the hydrodynamic bearing region and at the active bearing region,
    wherein the inner and outer members are operable for evacuating at least a portion of the liquid from the active bearing region during relative rotation of the inner and outer members,
    wherein the hydrodynamic bearing region includes a groove pattern on at least one of the outer surface of the inner member and the inner surface of the outer member, and the active bearing region includes a groove pattern formed on at least one of the outer surface of the inner member and the inner surface of the outer member, and wherein the active bearing region pumps the liquid through the hydrodynamic bearing region into a capillary seal.

19. The bearing system of claim 18, wherein the gas pumping strength of the active bearing region reaches equilibrium with the liquid pumping strength of the hydrodynamic bearing region after spin-up.

20. An active fluid dynamic bearing system, comprising:

an interface region formed between an outer surface of an inner member and an opposing inner surface of an outer member, the inner and outer members disposed for rotation of the inner and outer members relative to each other, and the interface region including a hydrodynamic bearing region and an active bearing region; and a liquid disposed in the interface region at the hydrodynamic bearing region and at the active bearing region, wherein the inner and outer members are operable for evacuating at least a portion of the liquid from the active bearing region during relative rotation of the inner and outer members, and wherein a portion of the interface region is formed by a conical journal having a crowned surface.

21. An active fluid dynamic bearing system, comprising:

an interface region formed between an outer surface of an inner member and an opposing inner surface of an outer member, the inner and outer members disposed for rotation of the inner and outer members relative to each other, and the interface region including a hydrodynamic bearing region and an active bearing region; and a liquid disposed in the interface region at the hydrodynamic bearing region and at the active bearing region, wherein the inner and outer members are operable for evacuating at least a portion of the liquid from the active bearing region during relative rotation of the inner and outer members, and wherein the active bearing region retains a portion of the liquid in a hydrodynamic portion of the active bearing region and functions as a gas bearing outside the hydrodynamic portion of the active bearing region.

22. A method for manufacturing an active fluid dynamic bearing system, comprising:

forming an inner member having an outer surface and an outer member having an inner surface, the inner and outer members formed for a disposition providing for relative rotation of the inner and outer member, and having an interface region between the inner surface and the outer surface;

forming a hydrodynamic bearing groove region on at least one of the outer surface of the inner member or the inner surface of the outer member for creating a hydrodynamic bearing region in the interface region;

forming an active bearing groove region on at least one of the outer surface of the inner member or the inner surface of the outer member for creating an active bearing region in the interface region;

disposing the inner and outer members and thereby creating the hydrodynamic bearing region and the active bearing region in the interface region created by the disposition; and providing a liquid in the hydrodynamic bearing region and in the active bearing region, where the inner and outer members are operable to at least partially evacuate the liquid upon relative rotation of the inner and outer members, wherein the inner and outer members are operable to completely evacuate the liquid upon relative rotation of the inner and outer members.

23. The method of claim 22, wherein the active bearing groove region is formed for creating an active journal bearing region.

24. A method for manufacturing an active fluid dynamic bearing system, comprising:

forming an inner member having an outer surface and an outer member having an inner surface, the inner and outer members formed for a disposition providing for relative rotation of the inner and outer member, and having an interface region between the inner surface and the outer surface;

forming a hydrodynamic bearing groove region on at least one of the outer surface of the inner member or the inner surface of the outer member for creating a hydrodynamic bearing region in the interface region;

forming an active bearing groove region on at least one of the outer surface of the inner member or the inner surface of the outer member for creating an active bearing region in the interface region;

disposing the inner and outer members and thereby creating the hydrodynamic bearing region and the active bearing region in the interface region created by the disposition; and providing a liquid in the hydrodynamic bearing region and in the active bearing region, where the inner and outer members are operable to at least partially evacuate the liquid upon relative rotation of the inner and outer members, wherein the active bearing groove region is formed for creating an active thrust bearing region.

* * * * *